US011946911B2

(12) United States Patent
Guo et al.

(10) Patent No.: US 11,946,911 B2
(45) Date of Patent: Apr. 2, 2024

(54) ANALYSIS SYSTEM AND METHOD FOR RAPIDLY DETECTING VITAMIN D IN AN OIL OR FAT, OR A BIOLOGICAL SAMPLE

(71) Applicant: SHIMADZU CORPORATION, Kyoto (JP)

(72) Inventors: Yanli Guo, Beijing (CN); Naoki Hamada, Beijing (CN); Yuki Hashi, Beijing (CN)

(73) Assignee: SHIMADZU CORPORATION, Kyoto (JP)

( * ) Notice: Subject to any disclaimer, the term of this patent is extended or adjusted under 35 U.S.C. 154(b) by 623 days.

(21) Appl. No.: 17/049,249

(22) PCT Filed: Jan. 25, 2019

(86) PCT No.: PCT/JP2019/002587
§ 371 (c)(1),
(2) Date: Oct. 20, 2020

(87) PCT Pub. No.: WO2019/207870
PCT Pub. Date: Oct. 31, 2019

(65) Prior Publication Data
US 2021/0239656 A1    Aug. 5, 2021

(30) Foreign Application Priority Data

Apr. 27, 2018  (CN) .......................... 201810394669.1

(51) Int. Cl.
*G01N 30/46* (2006.01)
*G01N 30/06* (2006.01)
(Continued)

(52) U.S. Cl.
CPC ............. *G01N 30/06* (2013.01); *G01N 30/46* (2013.01); *G01N 30/88* (2013.01); *G01N 2030/065* (2013.01); *G01N 30/89* (2013.01)

(58) Field of Classification Search
CPC .................................................. G01N 30/463
See application file for complete search history.

(56) References Cited

U.S. PATENT DOCUMENTS 5,492,555 A * 2/1996 Strunk ................. G01N 30/463
95/87
5,550,166 A * 8/1996 Ostlund ............... A61K 31/075
514/715

(Continued)

FOREIGN PATENT DOCUMENTS

CN        1144782 C     4/2004
CN     103930778 A     7/2014
(Continued)

OTHER PUBLICATIONS

Office Action dated Apr. 5, 2022 in Japanese Application No. 2020-516030.

(Continued)

*Primary Examiner* — Jamel E Williams
*Assistant Examiner* — Alex T Devito
(74) *Attorney, Agent, or Firm* — Sughrue Mion, PLLC

(57) ABSTRACT

The present invention relates to an analysis system that is applied to rapid automatic analysis and detection of highly lipophilic components and a method for rapidly detecting vitamin D in an oil or fat, or a biological sample. In the present invention, online pretreatment and separation of a sample containing highly lipophilic components in a sample to be analyzed are performed by a multidimensional chromatography system. The multidimensional chromatography system includes a supercritical chromatography part and a reverse phase liquid chromatography part sequentially connected, the reverse phase liquid chromatography part including one or more reverse phase liquid chromatography columns, and the supercritical chromatography part including a (Continued)

supercritical mobile phase, a modifier, and a supercritical packed column.

17 Claims, 4 Drawing Sheets

(51) Int. Cl.
*G01N 30/88* (2006.01)
*G01N 30/89* (2006.01)

(56) References Cited

U.S. PATENT DOCUMENTS

| | | | |
|---|---|---|---|
| 2001/0044548 A1 | 11/2001 | May et al. | |
| 2012/0240666 A1 | 9/2012 | Sims | |
| 2014/0147878 A1* | 5/2014 | Herman | G01N 33/82 |
| | | | 436/131 |
| 2014/0319057 A1 | 10/2014 | Brousmiche et al. | |

FOREIGN PATENT DOCUMENTS

| | | |
|---|---|---|
| CN | 104428045 A | 3/2015 |
| CN | 106457066 A | 2/2017 |
| EP | 1 122 250 A1 | 8/2001 |
| GB | 2521524 A | 6/2015 |
| JP | 63-1968 A | 1/1988 |
| JP | 8-310809 A | 11/1996 |
| JP | 2001-261671 A | 9/2001 |
| JP | 2014-514541 A | 6/2014 |
| JP | 2015-194363 A | 11/2015 |
| JP | 2015-215320 A | 12/2015 |
| JP | 2017-512310 A | 5/2017 |
| WO | 2012/129076 A1 | 9/2012 |
| WO | 2015/134317 A1 | 9/2015 |

OTHER PUBLICATIONS

Communication dated Dec. 5, 2022 in Chinese Patent Application No. 201980042766.7.
Communication dated Oct. 19, 2021 issued by the Japanese Patent Office in Application No. 2020- 516030.
Koga, "Tips for improving separation", LC Technical Report, vol. 17, No. 1, Apr. 2015, General Incorporated Association Chemicals Evaluation and Research Institute, [retrieved from URL: http://www.cerij.or.jp/service/09_chromatography/technical_report/technical_report_17.pdf], pp. 1 to 4, (8 pages total).
Office Action dated May 7, 2022 issued by the Chinese Patent Office in Chinese Application No. 201980042766.7.
Jia Yong-Juan et al., "Determination of theophylline in human serum by HPLC method with online SPE technology", Chinese Journal of Hospital Pharmacy, 2018, pp. 1-6 (14 pages total).
Zhang Yanhai, "Simultaneous determination of vitamins A, $D_3$ and E in infant formula and adult nutritions by online two-dimensional liquid chromatography", Chinese Journal of Chromatography, Mar. 2015, vol. 33, No. 3, pp. 291-297 (14 pages total).
Quan Sisi, "Simultaneous determination of multiple vitamins in infant formula by ultra-performance liquid chromatography/ supercritical fluid chromatography-tandem mass spectrometry", Guangdong Pharmaceutical University, thesis for master degree, 2017 (137 pages total).
Francois et al., "Construction of a new interface for comprehensive supercritical fluid chromatography x reversed phase liquid chromatography (SFC x RPLC)", Journal of Separation Science, 2008, vol. 31, pp. 3473-3478 (6 pages total).
Taguchi et al., "Simultaneous analysis for water-and fat-soluble vitamins by a novel single chromatography technique unifying supercritical fluid chromatography and liquid chromatography", Journal of Chromatography A, 2014, vol. 1362, pp. 270-277 (8 pages total).
Jenkinson et al., "Analysis of multiple vitamin D metabolites by ultra-performance supercritical fluid chromatography-tandem mass spectrometry (UPSFC-MS/MS)", Journal of Chromatography B, 2018, vol. 1087-1088, pp. 43-48 (6 pages total).
Francois et al., "Comprehensive supercritical fluid chromatography x reversed phase liquid chromatography for the analysis of the fatty acids in fish oil", Journal of Chromatography A, 2009, vol. 1216, pp. 4005-4012 (8 pages total).
Jumaah et al., "A rapid method for the separation of vitamin D and its metabolites by ultra-high performance supercritical fluid chromatography-mass spectrometry", Journal of Chromatography A, 2016, vol. 1440, pp. 191-200 (10 pages total).
Hamada et al., "Determination of vitamin D in oily drops using a column-switching system with an on-line clean-up by supercritical fluid chromatography", Talanta, 2018, vol. 190, pp. 9-14 (6 pages total).
National Food Safety Standard Determination of Vitamin A, D, E in Food, 2016 (50 pages total).
International Search Report dated Apr. 16, 2019 in International Application No. PCT/JP2019/002587.
International Search Report dated May 7, 2019 in International Application No. PCT/JP2019/002588.
Written Opinion of the International Searching Authority dated Apr. 16, 2019 in International Application No. PCT/JP2019/002587.
Written Opinion of the International Searching Authority dated May 7, 2019 in International Application No. PCT/JP2019/002588.
Decision of Rejection dated Mar. 31, 2023 issued for the corresponding Chinese Patent Application No. 201980042766.7.
Chinese Office Action dated Sep. 1, 2023 in Application No. 201980042766.7.

* cited by examiner

ANALYSIS SYSTEM AND METHOD FOR RAPIDLY DETECTING VITAMIN D IN AN OIL OR FAT, OR A BIOLOGICAL SAMPLE

CROSS REFERENCE TO RELATED APPLICATIONS

This application is a National Stage of International Application No. PCT/JP2019/002587 filed on Jan. 25, 2019, claiming priority based on Chinese Patent Application No. 201810394669.1 filed on Apr. 27, 2018.

TECHNICAL FIELD

The present invention relates to separation of highly lipophilic components from an oil or fat, or a biological sample, in particular, relates to an analysis system that is applied to separation of vitamin components, and belongs to the field of separation of natural substances.

BACKGROUND ART

Separation of highly lipophilic components from an oil or fat, or a biological sample has been always a focus point of studies. In the conventional techniques, various apparatuses and methods for separation and extraction have been studied.

Many attempts to separate vitamin components, in particular, vitamin D components have been made. Vitamin $D_2$ (also referred to as "ergocalciferol") and vitamin $D_3$ ("cholecalciferol") are lipophilic vitamins, and play a very important role in the metabolism of calcium. Vitamin D affects another metabolism pathway. Lack of vitamin D causes major diseases such as rickets and osteoporosis. Vitamin D supplements are generally used for therapy or prevention of vitamin deficiency. Also, to satisfy nutrition requirements for infants, vitamin D is added to prepared milk powder for infants. Incidentally, excessive intake of vitamin D may cause a risk. For this reason, appropriate use of vitamin D for vitamin supplements and formulated foods for infants plays a very important role in the medical care and the health.

Preparation of a sample solution before detection usually involves steps such as saponification and extraction because the content of vitamin D is small and vitamin D is vulnerable to hindrance from a substrate. Conventionally, a method of measuring vitamin D generally includes extracting vitamin D from an oil or fat, or a fatty substrate with a solvent, washing the extracted vitamin D by normal phase liquid chromatography (NPLC), and then performing separation and detection by a reverse phase liquid chromatography column (RPLC). However, conventional extraction techniques with a solvent require time and complicated works, and also consume a large amount of organic solvent. Thus, many attempts to simplify a process of preparing a sample have been made.

To analyze vitamin D in prepared milk powder for infants, a two-dimensional column switching system in two types of reverse phase liquid chromatographies used for removal of extract at online has been developed. Non Patent Literature 1 discloses a method of simultaneously measuring vitamin A, vitamin $D_3$, and vitamin E in formulated nutrient products for infants and adults, on the basis of reverse phase chromatography for one-dimensional separation and two-dimensional separation, by an online two-dimensional liquid chromatography method. The method involves saponifying and extracting a sample and then directly injecting the sample to perform analysis, and thus enables a quantitative analysis of respective vitamins in the sample at online even in one injection. Unfortunately, the sample extracted from an oily product or a fatty base body is washed by RPLC, leaving a certain amount of strongly hydrophobic lipophilic impurities on an RPLC column. Accumulation of impurities on the chromatography column not only changes the retention time of an object to be detected, but also reduces the lifetime of a washing column.

Meanwhile, high performance liquid chromatography method/ultra high performance liquid chromatography mass spectrometry (HPLC/UPLC-MS), which employs a simpler sample preparation method, has been already used for analysis of vitamin D in oily vitamin supplements, prepared milk powder for infants, or a biological fluid. However, in the normal condition, such a method requires an extraction process with a solvent at offline or a normal-phase solid-phase extraction (SPE) process in order to perform pretreatment of a sample or washing of components. Non Patent Literature 2 relates to a high-speed and high-sensitivity analysis method that employs UPLC-MS/MS and enables simultaneous measurement of lipophilic vitamin A, $D_2$, $D_3$, and α-tocopherol in prepared milk powder for infants. However, the method still requires treatment of the detected sample with an alkaline inorganic substance and extraction with an organic solvent. Thus, there is room for further improvement or enhancement from the viewpoint of ease of pretreatment.

Further, to achieve an automatic analysis system with high efficiency, a chromatography method which purifies an oil or fat, or a fatty sample with a normal phase liquid at online is still required. Then, it is possible to analyze a fatty eluate separated at a low level by reverse phase liquid chromatography to provide better resolution. However, two types of different mobile phases do not match to each other. Thus, it is difficult to establish a column switching system including both normal phase chromatography and reverse phase liquid chromatography at the same time.

Further, along with development of supercritical fluid technology, attempts to extract or separate substances by supercritical extraction or supercritical chromatography have been made. In the supercritical technology, there are retention time and separation behavior similar to the NPLC in separation and analysis of vitamin D. Patent Literature 1 discloses a method of separating vitamin $D_3$ or previtamin $D_3$ from a mixture with other components such as dehydrocholesterol, tachysterol, and lumisterol by column chromatography using supercritical carbon dioxide as a mobile phase. However, this method relates to only separation or purification after synthesis of a vitamin D product.

Accordingly, in the conventional techniques, improvement of a method of extracting highly lipophilic components from a system including complicated components, such as an oil or fat, and a biological sample, in particular, a method of extracting and separating vitamin D is considered to be insufficient in terms of convenience of application, ecological respect, and rapidity.

CITATION LIST

Patent Literature

Patent Literature 1: CN 1144782 C

Non Patent Literature

Non Patent Literature 1: "Simultaneous determination of vitamins A, $D_3$ and E in infant and adult formula nutritions by online two-dimensional liquid chromatography", Zhang Yanhai, «chromatography», March, 2015

Non Patent Literature 2: "Simultaneous determination of multiple vitamins in infant powdered formula by ultra-performance liquid chromatography/supercritical fluid chromatography-tandem mass spectrometry", Quan Sisi, Guangdong Pharmaceutical University, thesis for master degree, 2017

SUMMARY OF INVENTION

Technical Problem

The above conventional methods and analysis systems of extracting highly lipophilic components, in particular, extracting highly lipophilic components from a system including complicated components, such as an oil or fat, and a biological sample have problems such as a complicated pretreatment step, a large consume amount of solvent, and inconvenience of switching between chromatography analyses. In view of the problems, the present invention provides a method and analysis system that rapidly analyze highly lipophilic components, in particular, vitamin D in an oil or fat, or a biological sample by using a multidimensional chromatography system. The present invention employs reverse phase liquid chromatography and a supercritical chromatograph in combination, simply and rapidly separates highly lipophilic components, in particular, vitamin D, contained in an oil or fat, or a biological sample, and further detects and analyzes the separated vitamin D by using a detection apparatus.

The method and analysis system of the present invention allow convenient and rapid switching between different chromatography columns, thus allowing rapid and accurate detection of highly lipophilic components.

Solution to Problem

The present invention solves the above problems by the following embodiments.

The present invention first provides:

[1]. A method for rapidly analyzing and detecting vitamin D in a highly lipophilic component, in particular, an oil or fat or a biological sample, the method including:
step S1 of preparing a sample to be analyzed;
step S2 of separating vitamin D in the sample to be analyzed by using a multidimensional chromatography system; and
step S3 of detecting the vitamin D separated in the step S2, in which
in the step S2, the multidimensional chromatography system includes a supercritical chromatography part and a reverse phase liquid chromatography part which are sequentially connected;
the reverse phase liquid chromatography part includes one or more reverse phase liquid chromatography columns;
the supercritical chromatography part includes a supercritical mobile phase and a modifier; and
the modifier is selected from alcohol, nitrile, and an aqueous solution of alcohol, or nitrile, and is preferably, methanol or an aqueous solution of methanol.

[2]. The method according to [1], in which the supercritical chromatography part includes one supercritical chromatography column, and the reverse phase liquid chromatography part includes two reverse phase liquid chromatography columns.

[3]. The method according to [1] or [2], in which a multi-way valve group connects chromatography columns in the multidimensional chromatography system.

[4]. The method according to any one of [1] to [3], in which in the supercritical chromatography part,
the stationary phase is selected from a silica gel modified with a polar group selected from a hydroxy group, an amino group, and a cyano group, and preferably, the modified silica gel is selected from a diol group silica gel; and
the mobile phase is supercritical carbon dioxide.

[5]. The method according to any one of [1] to [4], in which in the reverse phase liquid chromatography part,
the stationary phase is selected from a silica gel modified with a hydrophobic group selected from an alkyl group, and preferably, the modified silica gel is a C18 silica gel; and
the mobile phase is a polar organic solvent or an aqueous solution of the polar organic solvent.

[6]. The method according to any one of [1] to [5], in which reverse phase liquid chromatography columns of the reverse phase liquid chromatography part are identical or different.

[7]. The method according to any one of [1] to [6], in which in the step S2, a weakly polar substance adsorbed to the supercritical chromatography is transported to the reverse phase liquid chromatography part by only an action of the modifier, and a supercritical mobile phase flowing out of the supercritical chromatography part is removed in the reverse phase liquid chromatography part.

[8]. The method according to any one of [1] to [7], in which the step S2 further includes:
step S21 of separating a component of a sample to be analyzed by using supercritical chromatography and transporting a weakly polar substance to a reverse phase liquid chromatography part;
step S22 of removing a supercritical mobile phase flowing out of the supercritical chromatography in the reverse phase liquid chromatography; and
step S23 of introducing a mobile phase into the reverse phase liquid chromatography and separating a substance present in the reverse phase liquid chromatography to obtain a vitamin D component separated, in which
transport of the weakly polar substance to the reverse phase liquid chromatography column in the step S21 may be performed at the same time as the step S22.

[9]. The method according to any one of [1] to [7], in which the step S2 further includes:
step S21' of separating a component of a sample by using supercritical chromatography and transporting a weakly polar substance to a first reverse phase liquid chromatography column of the reverse phase liquid chromatography part;
step S22' of removing a supercritical mobile phase flowing out of the supercritical chromatography in the first reverse phase liquid chromatography column; and
step S23' of further introducing a mobile phase into the first reverse phase liquid chromatography column, and transporting a weakly polar substance present in the chromatography column to a second reverse phase liquid chromatography column to be separated in the second reverse phase liquid chromatography column, thus obtaining a vitamin D component, in which transport of the weakly polar substance to the first reverse phase liquid chromatography column in the step S21' may be performed at the same time as the step S22'.

[10]. The method according to any one of [1] to [9], the method including, before the step S2, a step of separating a protein component in a sample to be analyzed by using a pretreatment chromatography column, in which in the step S3, detection is performed by using a mass spectrometer.

The present invention further provides the following embodiments.

[11] An analysis system including:
an autosampler;
a multidimensional chromatography system including a supercritical chromatography column and one or more reverse phase liquid chromatography columns, a nonpolar substance being eluted and removed in the supercritical chromatography column, and a weakly polar substance being adsorbed to a stationary phase of the supercritical chromatography column and further transported to the one or more reverse phase liquid chromatography columns;
a column oven in which a column is to be provided;
a liquid pump configured to transport a modifier to the supercritical chromatography column and transport a mobile phase to the one or more reverse phase liquid chromatography columns; and
a mass spectrometer.

[12] The system according to [11], in which the modifier is selected from alcohol, nitrile, and an aqueous solution of alcohol or nitrile, and is preferably, methanol or an aqueous solution of methanol.

[13] The system according to [11] or [12], in which a multi-way valve group connects or switches connection between the supercritical chromatography column and the one or more reverse phase liquid chromatography columns in the multidimensional chromatography system.

[14] The system according to any one of [11] to [13], in which a weakly polar substance adsorbed to the supercritical chromatography column is transported to the reverse phase liquid chromatography column by only an action of the modifier to remove a supercritical mobile phase flowing out of the supercritical chromatography column in the reverse phase liquid chromatography column.

[15] The system according to any one of [11] to [14], in which the multidimensional chromatography system includes one reverse phase liquid chromatography column; and a weakly polar substance adsorbed to the supercritical chromatography column is transported to the reverse phase liquid chromatography column by only an action of the modifier, a supercritical mobile phase flowing out of the supercritical chromatography column is removed in the reverse phase liquid chromatography column, and then a component of the weakly polar substance is separated by the reverse phase liquid chromatography column.

[16] The system according to any one of [11] to [14], in which the multidimensional chromatography system includes two reverse phase liquid chromatography columns; and a weakly polar substance adsorbed to the supercritical chromatography column is transported to a first reverse phase liquid chromatography column by only an action of the modifier to remove a supercritical mobile phase flowing out of the supercritical chromatography column in the reverse phase liquid chromatography column,
then the weakly polar substance is transported to a second reverse phase liquid chromatography column to separate a component.

[17] The system according to any one of [11] to [16], in which in the supercritical chromatography column,
the stationary phase is selected from a silica gel modified with a polar group selected from a hydroxy group, an amino group, and a cyano group, and preferably, the modified silica gel is a diol group silica gel; and
the mobile phase is supercritical carbon dioxide.

[18] The system according to any one of [11] to [17], in which in the reverse phase liquid chromatography column,
the stationary phase is selected from a silica gel modified with a hydrophobic group selected from a hydrocarbon group, and preferably, the modified silica gel is a C18 silica gel; and
the mobile phase is a polar organic solvent or an aqueous solution of the polar organic solvent.

[19] The system according to any one of [11] to [18], in which at least the reverse phase liquid chromatography column configured to perform separation of the weakly polar substance is placed in a column oven.

[20] The system according to any one of [11] to [19], in which the system has a pretreatment column configured to separate a protein component in a sample to be analyzed.

[21] The system according to any one of [11] to [19], in which the system is used for automatically detecting a highly lipophilic component in an oil or fat or a biological sample.

[22] The system according to [21], in which the highly lipophilic component is vitamin D.

Advantageous Effects of Invention

The present invention can provide the following advantageous effects by the above technological embodiments.

In the present invention, analysis and detection of highly lipophilic components, in particular, detection of these components, for example, vitamin D from an oil or fat, or a biological sample, do not require complicated pretreatment for a sample. Thus, there is no need to extract vitamin D components by using a large amount of solvent in a pretreatment step as in the conventional techniques.

The multidimensional chromatography system provided by the present invention can achieve direct switching between different types of chromatography columns, that is, between a supercritical chromatography column and a reverse phase liquid chromatography column. Thus, the multidimensional chromatography provided by the present invention can prevent a defect that there is no compatibility in a mobile phase when different types of columns are normally used in combination.

Further, the method or analysis system provided by the present invention allows rapid and accurate analysis and detection of highly lipophilic components, in particular, these components, for example, vitamin D in an oil or fat, or a biological sample. The method or analysis system provided by the present invention especially allows operation with high-level automation, thus remarkably improving analysis efficiency and reducing analysis cost.

Moreover, detecting highly lipophilic components, in particular, vitamin D components by the method of the present invention provides a detection result exhibiting a favorable linear correlation coefficient, and also provides a favorable reproducibility and a high recovery.

DESCRIPTION OF EMBODIMENTS

Figure 1A:
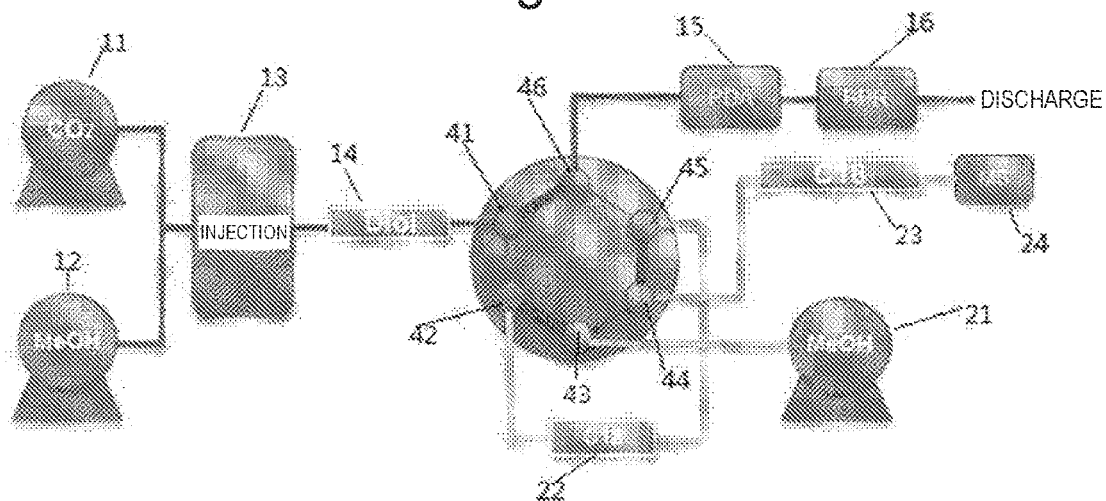
FIGS. 1A to 1C are flow charts of a detection process of vitamin D according to an embodiment of the present invention.

Hereinafter, the contents of the present invention will be described in detail. The descriptions of the technical constitutions described below are based on representative embodiments and specific examples according to the present invention. The present invention is not limited to these embodiments and specific examples. Note that in the present specification, a numerical range indicated using "from . . . to" means a range including the numbers before and after to as the lower limit value and the upper limit value. Unless otherwise noted, the unit denoted by "/" refers to the volume percentage, that is "V %".

First Embodiment of Present Invention

The first embodiment of the present invention provides a method that can rapidly detects highly lipophilic components, in particular, highly lipophilic components in an oil or fat sample, or a biological sample. Specifically, vitamin D serving as a representative of the lipophilic components will be described as follows.

An object to be analyzed may be substances containing various highly lipophilic components, in particular, nutritional supplementary foods or nutrients containing vitamin D, or may be prepared milk powder or foods for infants. In some embodiments of the present invention, these substances containing vitamin D may be in the form of solid, or may be in the form of liquid or paste.

In some embodiments, these samples do not have to be subjected to pretreatment as necessary. A means for pretreatment is not particularly limited as long as the content of vitamin D in the sample to be analyzed is not impaired. Also, for ease of dissolving the sample, a fine powder can be obtained by using a means such as drying and crushing. Alternatively, a pretreatment means such as saponification, and enzymatic degradation can be used for milk powder or rice powder, for example. Alternatively, the sample to be analyzed is directly subjected to extraction treatment for a part of oil or fat components with an organic solvent, thereby extracting components such as vitamin D in the sample into the organic solvent.

The sample that has been pretreated as necessary is dissolved or diluted with an organic solvent, thus preparing a sample solution to be analyzed. In the present invention, the organic solvent can be selected from a hydrocarbon solvent, a ketone solvent, an ether solvent and other similar substances. In a preferred embodiment, a hydrocarbon solvent such as n-hexane can be used.

A solution of a sample to be analyzed that has been already dissolved can be injected into a detection apparatus by an autosampler.

In another embodiment of the present invention, protein components in the sample can be removed by, for example, chromatography before the sample is subjected to detection. For example, protein components in the sample are removed by using a pretreatment column in advance, and then vitamin D components are separated and detected in the sample. Thereby, the present invention allows detection for a biological sample containing vitamin D, such as blood.

Multidimensional Chromatography System

The multidimensional chromatography system of the present invention provides a role of preliminary washing and separating a sample solution to be analyzed. The multidimensional chromatography system includes a supercritical chromatography part and a reverse phase liquid chromatography part.

Supercritical Chromatography Part

The supercritical fluid chromatography (SFC) is a chromatography process that uses a supercritical fluid as a mobile phase and performs separation and analysis of components due to ability of the mobile phase to work as a solvent.

The supercritical fluid chromatography has characteristics of both gas chromatography and liquid chromatography. The supercritical fluid chromatography enables analysis of a low volatile sample with a high boiling point, which is not suitable for gas chromatography, and provides more rapid analysis speed and optimal conditions than high performance liquid chromatography. In the present invention, a sample solution is preliminary washed by using a supercritical chromatography column. That is, nonpolar oil or fat components in the sample solution to be analyzed are removed.

In the present invention, the supercritical chromatography column may be a packed column, or may be a capillary column. In some embodiments, packed column supercritical fluid chromatography (PCSFC) is preferable.

The stationary phase of the supercritical chromatography column is selected from a silica gel modified with a polar group. The polar group can be selected from a hydroxy group, an amino group, and a cyano group. In some preferred embodiments, in a case of preliminary washing a sample solution by a supercritical chromatography column, a hydroxy group is preferably used as a modification group in consideration of the need to secure appropriate retention time of vitamin D. More specifically, as the stationary phase of supercritical chromatography column of the present invention, a diol group silica gel, which is bonded by using 1,2-dihydroxypropyl functional group-containing organosilane, is preferably used. Further, the stationary phase may be a porous spherical silica gel.

As the mobile phase of the supercritical chromatography column of the present invention, a supercritical fluid, which exhibits a state between gas and liquid of a substance under a condition of being equal to or more than the critical temperature and the critical pressure, can be selected. An appropriate supercritical fluid can be supercritical carbon dioxide or supercritical ethane. In some embodiments of the present invention, the supercritical mobile phase is selected from supercritical carbon dioxide. The working temperature and pressure are determined mainly depending on the selected supercritical mobile phase. In the present invention, in a case of using supercritical carbon dioxide as a supercritical mobile phase, the working temperature is 31° C. or more, and preferably 35° C. or more, and the working pressure is 7.3 MPa or more, and preferably 7.5 MPa or more. From the viewpoint of the solubility of vitamin D in the supercritical fluid, the retention time, and the workability, the working temperature is preferably 40 to 60° C., and the working pressure is preferably 7.5 to 15 MPa.

In the present invention, a modifier is used as a substance for adjusting the polarity of a supercritical carbon dioxide fluid. The modifier can be selected from alcohol and nitrile. As the modifier, various types of aliphatic alcohols such as methanol and isopropanol can be used among alcohols, and acetonitrile and the like can be used among nitriles. The used amount (relative flow rate) of the modifier can be usually 1% to 5% of the mobile phase. From the viewpoint of controlling the retention time of vitamin D, the amount of the modifier of the present invention is preferably 1.5% to 4%, more preferably 2% to 3%, and most preferably 2% to 2.5%. Further, from the viewpoint of controlling the retention time, the purity of the modifier is 80% or more, preferably 90% or more, and more preferably 100%.

The mobile phase and the modifier of the present invention can be supplied to the column by a liquid pump. In some embodiments, the supercritical chromatography column of the present invention can be placed in an oven. The supercritical chromatography part may include a $CO_2$ supply pump independent from a detector and a pressure control unit (for example, a back-pressure control unit BPR). In some embodiments, the pressure control unit is provided at an end of the supercritical chromatography part and is used for discharge of the mobile phase and waste liquid. The detector is not particularly limited. The detector is disposed before the back-pressure control unit, and can detect respective components eluted from the column. In particular, the detector can detect the outflow of vitamin D, thus enabling determination of the retention time of vitamin D in the sample solution. Preferably, the detector may be a diode array detector.

The supercritical chromatograph used for the present invention can be obtained from commercially available products, and may be, for example, "Nexera UC", supercritical chromatography system available from Shimadzu Corporation.

The sample solution is added to the supercritical chromatography part by an autosampler, and then the supercritical chromatograph is actuated. Weakly polar substances such as vitamin D in the sample remain in the column whereas nonpolar oils or fats are rapidly eluted from the column.

In this step, rapid preliminary washing of components containing vitamin D is completed by supercritical chromatography, thus enabling easy and convenient removal of nonpolar oil or fat components.

Switching Apparatus

In the treatment of supercritical chromatography, after the nonpolar oil or fat components have been removed, the system is switched to the reverse phase liquid chromatography part before the time reaches the retention time of vitamin D.

In some embodiments of the present invention, the above switching can be performed by using a multi-way valve group. The multi-way valve group is not particularly limited, and various multi-way valves for injection can be used that are generally used in the field of liquid chromatography. In the present invention, use of a six-way valve group or a ten-way valve group is preferable, and use of a six-way valve group is more preferable. The different switching operation of the multi-way valve group can achieve different flow paths or different connection paths. Such a multi-way valve group is suitable for, in particular, connection and control between a plurality of types of apparatuses.

Switching by a switching apparatus involves disconnecting the liquid outlet of the supercritical chromatography column from the detector and the pressure control apparatus, and simultaneously connecting the liquid outlet of the supercritical chromatography column to the liquid inlet of the reverse phase liquid chromatography via the multi-way valve group. Further, the end of the reverse phase liquid chromatography is connected to at least the pressure control unit via the multi-way valve group simultaneously.

In the present invention, supply of the mobile phase to the supercritical chromatography column is stopped at the time of or before performing switching. Supply of the modifier is not stopped during the switching, and the supply rate of the modifier can be increased after completion of switching. For example, the supply rate can be increased up to 0.5 to 1 mL/min. In this case, weakly polar substances, which have been adsorbed to the supercritical chromatography column and contain vitamin D, are eluted by only the flow of the modifier, and can enter the reverse phase liquid chromatography part together with supercritical carbon dioxide left in the system through the multi-way valve.

The above switching completes step S21. That is, the components of the sample to be analyzed are separated by supercritical chromatography, and weakly polar substances containing vitamin D are transported to the reverse phase liquid chromatography part. Alternatively, the above switching completes step S21'. That is, components of the sample are separated by supercritical chromatography, and weakly polar substances containing vitamin D are transported to a first reverse phase liquid chromatography column of the reverse phase liquid chromatography part.

Reverse Phase Liquid Chromatography Part

In the present invention, the reverse phase liquid chromatography part includes one or more reverse phase liquid chromatography columns. In some embodiments, these reverse phase liquid chromatography columns are placed in an oven at the time of use.

The stationary phase of the reverse phase liquid chromatography column of the present invention may be a silica gel modified with a hydrophobic group. The above hydrophobic group may be various hydrocarbon groups such as a C8 group, a C18 group, and a phenyl group. In some embodiments of the present invention, a silica gel modified with a C18 group is used as the stationary phase. As the mobile phase, a polar organic solvent such as alcohol and nitrile, or an aqueous solution of such a polar organic solvent can be used. As the alcohol, various types of aliphatic alcohols such as methanol and isopropanol can be used. As the nitrile, acetonitrile and the like can be used. In some embodiments, the mobile phase can be used as an aqueous solution. For example, a methanol aqueous solution may be used. In a case of using as an aqueous solution, the content of the polar organic solvent in the mobile phase needs to be 60% or more, preferably 80% or more, and more preferably 90% or more from the viewpoint of reducing the retention time. In some preferred embodiments of the present invention, the mobile phase of the reverse phase liquid chromatography is 90% or more methanol, or 100% methanol.

In some embodiments of the present invention, the reverse phase liquid chromatography part can include only one column. As described above, the reverse phase liquid chromatography and the supercritical chromatography are connected in series after switching. At that time, the end of the reverse phase liquid chromatography is also switched or connected to the above pressure control unit. The above multi-way valve group also can achieve such a constitution of switching or connection.

As described above, the weakly polar components adsorbed to the supercritical chromatography column continue to be eluted by the modifier after switching of the column. In some preferred embodiments, the flow rate of the modifier can be increased at that time from the viewpoint of improving the elution efficiency. Thus, these weakly polar components can be rapidly eluted from the supercritical chromatography column. Further, these components enter the reverse phase liquid chromatography column together with the supercritical mobile phase remaining in the system. At that time, the end of the reverse phase liquid chromatography column has been already connected to the pressure control unit. Thus, the operation of the pressure control unit can discharge the supercritical mobile phase in the system to the outside of the system. Such a process does not affect the state of another mobile phase or components. Step S22 is completed at this time. That is, in the reverse phase liquid chromatography, the mobile phase flowing out of the supercritical chromatogram is removed.

A mobile phase is introduced into the reverse phase liquid chromatography column simultaneously with or after removal of the supercritical mobile phase by using the liquid pump of liquid chromatography. In some embodiments of the present invention, the mobile phase of the reverse phase liquid chromatography may be the same as or different from the modifier in the supercritical chromatography. In a preferred embodiment, both are the same. For example, both are a methanol aqueous solution with a purity of 80% or more, a methanol aqueous solution with a purity of 90% or more, or a methanol with a purity of 100%. In the present invention, since the supercritical mobile phase derived from the supercritical chromatography has been removed, only the weakly polar components and the polar modifier which are to be separated in the reverse phase liquid chromatography, remain. In this case, a polar mobile phase can be directly introduced into the reverse phase liquid chromatography column. This allows solving of a problem with mismatch of the mobile phase at the time of switching between different types of columns.

Introducing the polar mobile phase into the reverse phase liquid chromatography column system again allows separation of weakly polar substances. Step S23 is completed at this time. That is, a mobile phase is further introduced in the above reverse phase liquid chromatography, and substances present in the reverse phase liquid chromatography are separated, thus obtaining the separated vitamin D components (step S23). The vitamin D components herein include vitamin $D_2$ and vitamin $D_3$ components.

In a case of performing the above step S23, in particular, after the supercritical mobile phase derived from the supercritical chromatography column is removed by using the pressure control unit as described above, the reverse phase liquid chromatography is disconnected from the pressure control apparatus, and the reverse phase liquid chromatography is connected to a mass spectrometer by switching of the multi-way valve group. At this time, the separated vitamin D components can be detected and analyzed by using the mass spectrometer.

In another embodiment of the present invention, the reverse phase liquid chromatography part can include two or more columns. In typical embodiments, the reverse phase liquid chromatography part can include two columns connected in series.

The step S21' is the same as the above step S21. The components of the sample to be analyzed are separated by the supercritical chromatography to remove nonpolar oily substances, then supply of the supercritical mobile phase is stopped, and the modifier continues to be introduced. Switching between the columns via the multi-way valve group is performed by increasing the introduction flow rate of the modifier. Thus, the weakly polar components containing vitamin D adsorbed to the supercritical chromatography column can be transported to the first reverse phase liquid chromatography column.

In step S22', the end of the first reverse phase liquid chromatography column is first connected to the pressure control unit, and the supercritical mobile phase, which has been transported to the column, is discharged.

Further, the first reverse phase liquid chromatography is disconnected from the pressure control apparatus by switching of the multi-way valve group, and the pressure control apparatus is connected to a second reverse phase liquid chromatography.

In step S23', the liquid pump is actuated simultaneously with or after discharging of the supercritical mobile phase, and the polar mobile phase is transported to the first reverse phase liquid chromatography. After the first and second reverse phase liquid chromatography columns are connected, the weakly polar components adsorbed to the first reverse phase liquid chromatography column is further eluted to the second reverse phase liquid chromatography column, thus separating the vitamin D components in the second reverse phase liquid chromatography column.

The vitamin D separated in the second reverse phase liquid chromatography can be analyzed and detected by using the mass spectrometer connected to the column in series.

The above first reverse phase liquid chromatography column and the second reverse phase liquid chromatography column may be the same or different. In a preferred embodiment of the present invention, both columns are different. For example, the second reverse phase liquid chromatography column is longer than the first reverse phase liquid chromatography column. Such a design facilitates elution of weakly polar substances in the first reverse phase liquid chromatography column, and also enhances accuracy of separation in the second reverse phase liquid chromatography column. Accordingly, the first reverse phase liquid chromatography column can be considered to be a pretreatment column of the second reverse phase liquid chromatography column. The first reverse phase liquid chromatography column plays a role of collecting the weakly polar substances mainly containing vitamin D and removing the supercritical mobile phase.

Hereinafter, a preferred embodiment of the present invention will be described with reference to FIGS. 1A to 1C.

A vitamin D supplement for infants was analyzed by the method of the present invention. An appropriate amount of the oily sample was taken, and the sample was dissolved in n-hexane.

The sample was introduced into an autosampler 13, and the supercritical chromatograph is actuated. Supercritical carbon dioxide and a modifier are respectively transported to a column 14 via a pump 11 and a liquid pump 12. At this time, the chromatograph column 14 is sequentially connected to a diode array detector 15 and a pressure control unit 16 via connection parts 41 and 46 of the six-way valve to form a flow path A. With the flow of the supercritical mobile phase, nonpolar oil or fat components are washed off in the column 14, and weakly polar components containing vitamin D are adsorbed to the stationary phase of the column 14. Thereby, preliminary washing of the weakly polar components containing vitamin D is completed.

Supply of the supercritical fluid is stopped while switching the system by using the six-way valve before the time reaches the retention time of vitamin D. However, the flow rate of the modifier is increased without stopping supply of the modifier. Simultaneously, in the six-way valve, connection parts 41 and 46 are disconnected, connection parts 41 and 42 are connected, and connection parts 45 and 46 are connected, thus forming a flow path B. This flow path sequentially includes the column 14, a column 22, the diode array detector 15, and the pressure control unit 16. In this flow path, the modifier, whose flow rate has been increased, transports the weakly polar components from the column 14 to the column 22. Further, the pressure control unit 16 discharges the supercritical carbon dioxide remaining in the system.

After carbon dioxide is completely removed, connection parts 42 and 43, and connection parts 44 and 45 of the six-way valve are respectively connected while the connection parts 41 and 42, and the connection parts 45 and 46 of the six-way valve are respectively disconnected, and a polar mobile phase is supplied to the column 22 by a liquid pump 21. In this way, a flow path C including two reverse phase liquid chromatography columns 22 and 23 connected in series is formed. The weakly polar components are allowed to flow from the column 22 to the column 23 via a pipe line, thus completing separation of vitamin D component in the column 23.

Further, the column 23 can be directly connected to a mass spectrometric detector 24 at the end of the flow path C. Thereby, analysis and detection of respective components of vitamin D can be achieved.

Second Embodiment of Present Invention

The second embodiment of the present invention provides a system that is applied to analysis and detection of highly lipophilic components, in particular, a system that is applied to automatic detection of highly lipophilic components, for example, vitamin D in an oil or fat, or a biological sample. Such a system is used for performing the method of detecting highly lipophilic components, in particular, vitamin D in the first embodiment of the present invention.

Such a system includes:

an autosampler;

a multidimensional chromatography system including a supercritical chromatography column and one or more reverse phase liquid chromatography columns, a nonpolar substance being eluted and removed in the supercritical chromatography column, and a weakly polar substance being adsorbed to a stationary phase of the supercritical chromatography column and further transported to the reverse phase liquid chromatography column;

a column oven in which a column is to be provided;

a liquid pump configured to transport a modifier to the supercritical chromatography column and transport a mobile phase to the one or more reverse phase liquid chromatography columns; and a mass spectrometer.

The modifier used for the supercritical liquid chromatography is the same as the modifier described above. The modifier is one selected from alcohol, nitrile, and an aqueous solution of alcohol or nitrile, and is preferably methanol or a methanol aqueous solution. In some preferred embodiments of the present invention, an 80% or more, or 90% or more methanol aqueous solution can be used.

The multi-way valve group connects or switches connection between the supercritical chromatography column and the one or more reverse phase liquid chromatography columns in the multidimensional chromatography system. As described above, the multi-way valve group of the present invention is preferably a six-way valve group or a ten-way valve group.

Further, the weakly polar substances adsorbed to the supercritical chromatography column are transported to the reverse phase liquid chromatography column by only the action of the modifier to remove the supercritical mobile phase flowing out of the supercritical chromatography column in the reverse phase liquid chromatography column.

In a case where the multidimensional chromatography system includes one reverse phase liquid chromatography column, the weakly polar substance adsorbed to the supercritical chromatography column is transported to the reverse phase liquid chromatography column by the action of the modifier to remove the supercritical mobile phase flowing out of the supercritical chromatography column in the reverse phase liquid chromatography column. Further, the weakly polar substances separate into components in the reverse phase liquid chromatography column.

In a case where the multidimensional chromatography system includes two reverse phase liquid chromatography columns, the weakly polar substances adsorbed to the supercritical chromatography column are transported to the first chromatography column by only the action of the modifier to remove the supercritical mobile phase flowing out of the supercritical chromatography column in the first chromatography column.

Further, the weakly polar substances are transported to the second reverse phase liquid chromatography column to separate components.

The stationary phase and the mobile phase used for such a supercritical chromatography column and reverse phase liquid chromatography column are each in the same range as those disclosed above.

Also, a reverse phase liquid chromatography column which performs separation of at least weakly polar substances is placed in an oven.

Further, in some embodiments of the present invention, such a system has a pretreatment column for separating protein components in a sample to be analyzed. Such a pretreatment column can be placed in, for example, the upstream of the supercritical chromatography column.

Example

Hereinafter, Examples of the present invention will be described. However, the present invention is not limited to the following Examples.

<Chemical and Reagent>

Analysis standard compound: vitamin $D_2$ and vitamin $D_3$ (purchased from the laboratory of Dr. Ehrenstorfer). Vitamin supplement (Baby Ddrops, lot number: 187759, liquid vitamin $D_3$, 400 IU/drop, purchased from Ddrops Company). Methanol (LC-MS grade) and hexane (HPLC grade) (SFC grade of Thermo Fisher Scientific). Carbon dioxide ($CO_2$, purity ≥99.99%, Beijing, China).

<Apparatus>

An experiment was performed by using a Shimadzu Nexera UC system coupled to Shimadzu LC-MS 8050 (Kyoto, Japan). The UC system is constituted by a CBM-20A controller, an online DGU-20A degas chamber, an LC-30AD SF $CO_2$ pump, an LC-30 AD modifier pump, an SIL-30AC autosampler (equipped with a 5 μL sample loop), a CTO-20AC column oven, an SPD M20A diode array detector (equipped with a high-voltage battery), and one SFC-30A back-pressure regulator (BPR). Further, one high-pressure six-way valve for switching columns is placed in a column oven. For data collection and system control, Shimadzu Labsolution Ver. 5.8.5 was used.

An SFC column (4.6 mm×250 mm, 5 μm) includes an SFC mode used for preliminary separation, and contains three materials of UC-X silica, UC-X $NH_2$, and UC-X (diol group). A short C18 column (VP-ODS, 4.6 mm×50 mm, 5 μm), a long C18 column for separation of vitamin D (4.6 mm×250 mm, 5 μm), and two reference columns composed of a diol group column and a C18 column (4.0 mm×10 mm, 5 μm) for checking the retention time of vitamin D in a case of using methanols with different proportions for the mobile phase are used. All columns were purchased from Shimadzu-GL Sciences (Shanghai) Laboratory Supplies Co., Ltd.

<Preparation of Standard Solution and Sample Solution>

A standard stock solution of vitamin D was prepared in n-hexane such that $D_3$ was 1 mg/mL and $D_2$ was 1 mg/mL. All standard stock solutions are stored at −30° C. A test standard solution is prepared by diluting a stock solution of vitamin D with n-hexane to be 10 to 200 μg/L.

One drop of Baby Ddrops (about 10 μg/drop) was diluted with n-hexane. The final concentration of vitamin $D_3$ was about 100 μg/L. A droplet agent of vitamin AD was pushed out from a soft capsule, and diluted with n-hexane. The final concentration of vitamin $D_3$ was about 125 μg/L.

<SFC-LC/MS Column Switching System>

Figure 1B:
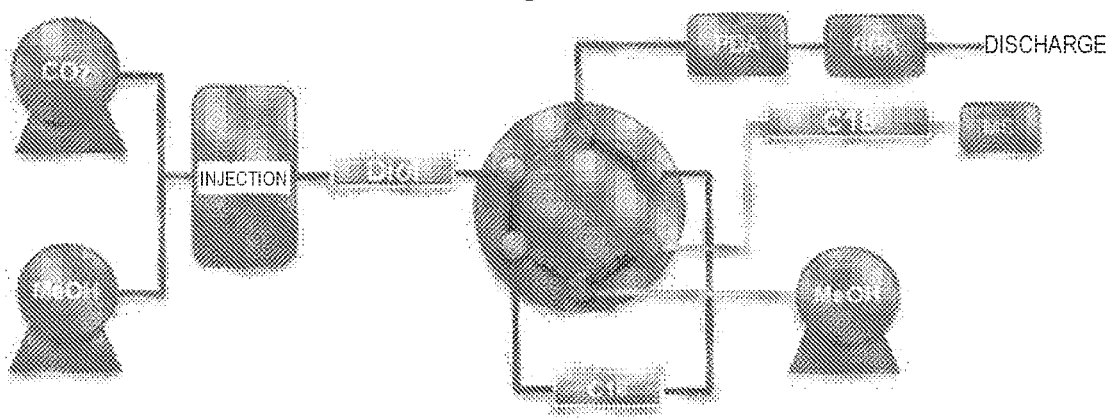
Figure 1C:
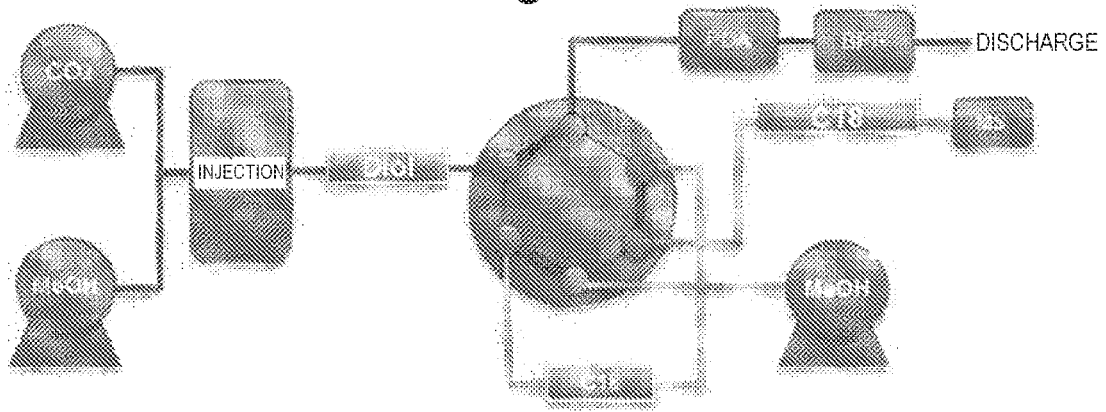

As illustrated in FIGS. 1A to 1C, the SFC and LC/MS include a high-pressure six-way valve which changes a position between 0 and 1. In one analysis, the valve changed twice, and there were three steps.

Preliminary Washing Step Using SFC

In this step, a sample containing vitamin D was injected into a system, and a mixture of a supercritical carbon dioxide fluid and methanol was passed through the system. The vitamin D sample was passed through a normal phase column, whereby vitamin D and impurities were each retained in the column to be separated. The BPR provides a back-pressure of 15 MPa. In another embodiment, two C18 columns for pretreatment and reverse phase separation were used, and washing was performed with methanol at a flow rate of 1 ml/min.

Treatment Step of Supercritical Carbon Dioxide Using Pretreatment Reverse Phase Column The position of the valve was switched from the position 0 to the position 1 before vitamin D is eluted from the SFC column, and the operation of the $CO_2$ pump was stopped. Only methanol flowing at a flow rate of 0.5 mL/min remained in the mobile phase, and the back-pressure of the BPR was kept 15 MPa. Vitamin D and remaining supercritical $CO_2$ were allowed to flow from the SFC column to a pretreatment C18 column (length: 50 mm). Vitamin D was retained in the pretreatment C18 column, and the supercritical $CO_2$ fluid was eluted from the column and discharged. Meanwhile, a reverse phase separation C18 column (length: 250 mm) was washed with methanol still flowing at a flow rate of 1 mL/min.

Separation Step Using Reverse Phase Separation C18 Column

The valve was returned from the position 1 to the position 0 before vitamin D is eluted from the pretreatment C18 column, thus allowing vitamin D to flow from the pretreatment C18 column to the reverse phase separation C18 column with methanol at a flow rate of 1 mL/min. Vitamin D was separated in the reverse phase separation C18 column, and then detected by the MS/MS. Data collection was performed in a cationic electrospray ionization (ESI) mode as follows. The conditions are as follows.

Capillary voltage: 4 kV, interface temperature: 300° C., DL temperature: 250° C., heating block temperature: 400° C., spray gas flow rate: 3 L/min, heating gas flow rate: 10 L/min, drying gas flow rate: 10 L/min. In this process, a multiple reaction monitoring (MRM) means was used (vitamin $D_2$ m/z 397.30>69.10, 397.30>271.20; vitamin $D_3$ m/z 385.30>259.20, 385.30>367.30). Meanwhile, the SFC column was washed with the supercritical fluid for preparation of the next analysis as in the step S1.

<Result and Study>

Optimization of Condition for SFC-LC/MS Column Switching

To confirm effects of the type of column and the composition of the mobile phase on the retention time of vitamin D, the retention behavior of vitamin D in SFC columns having different functional groups, and effects of the composition of the mobile phase on the retention time were studied.

Optimization of SFC

The retention behavior of vitamin D was examined by using three supercritical fluid columns ($NH_2$, diol, and silica) having different polar functional groups.

Figure 2A:
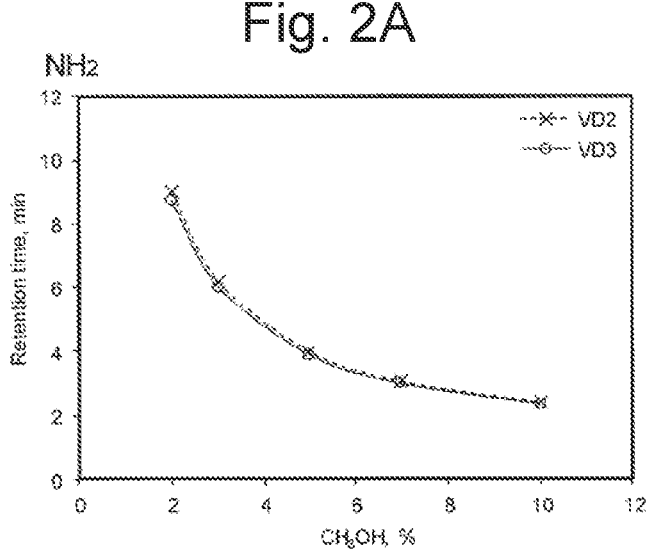
FIG. 2A to 2C show the effect of the used amount of modifier relative to $CO_2$ on the retention behavior of different columns in an SFC process.
Figure 2B:
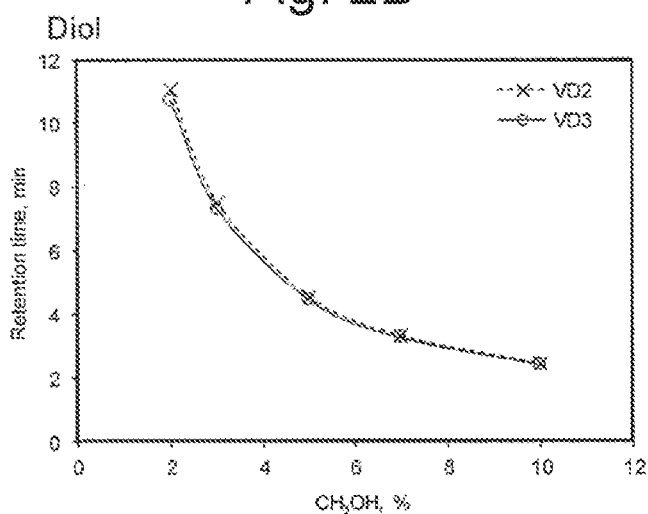
Figure 2C:
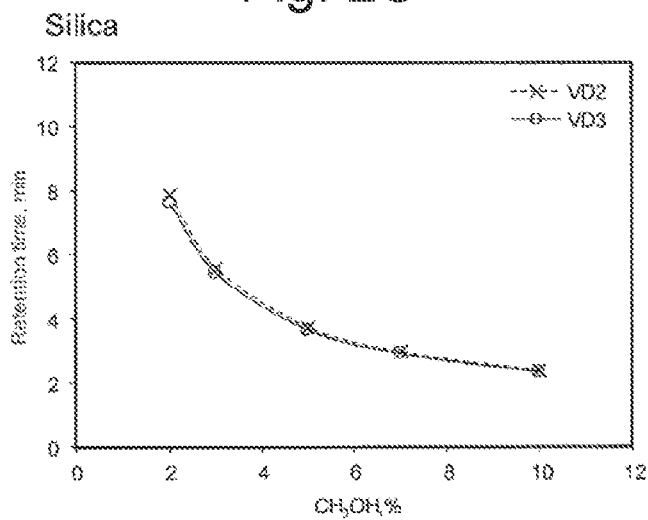

As shown in FIGS. 2A to 2C, the retention time of vitamin D increased with decrease in the content of methanol serving as a modifier in each column. In an optional proportion of methanol, the retention times of vitamin $D_2$ and $D_3$ are approximately the same. Vitamin D exhibited the longest retention time in a diol group column compared to $NH_2$ and silica columns. A longer retention time means that the vitamin D components do not dissolve or elute, and thus time required for washing and removing nonpolar oil or fat components in the SFC column is long. At last, a diol group column was selected, and the flow rate of methanol serving as the modifier was set to 2% (relative to the flow rate of the supercritical $CO_2$). The column was used for washing an oily product or a lipid sample containing vitamin D.

Effects of Composition of Mobile Phase in Diol Group Column and C18 Column after Stopping Supply of $CO_2$ To confirm effects of the composition of the mobile phase in the diol group column and C18 column after supply of $CO_2$ was stopped, effects of the proportion of methanol and water in the mobile phase on the retention behavior of the diol group column and C18 column were examined. A guard column (length: 10 mm) was used for reducing analysis time.

Figure 3:
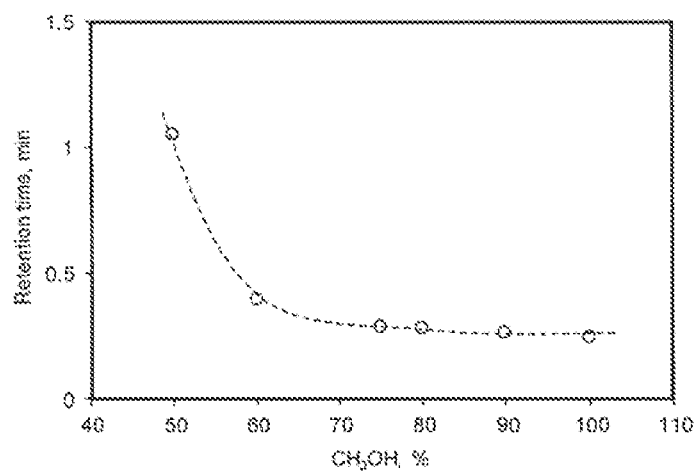
FIG. 3 shows the effect of different contents of methanol in a diol group column on the retention behavior.

The results show that increase in the proportion of methanol in the mobile phase in the supercritical chromatography column after supply of $CO_2$ was stopped results in decrease in the retention time of vitamin $D_3$ in the diol group column (FIG. 3).

Accordingly, the results show that, as a whole, a case of using a high content of methanol as the modifier (90% and 100% methanol) while keeping the ratio of the flow rate of the modifier to the flow rate of the supercritical $CO_2$ low in the SFC process results in longer retention time of vitamin D in the SFC washing process, rapid elution of the vitamin D components from the SFC column even after supply of supercritical carbon dioxide is stopped, and thus ensures achievement of pretreatment with the C18 column.

Figure 4:
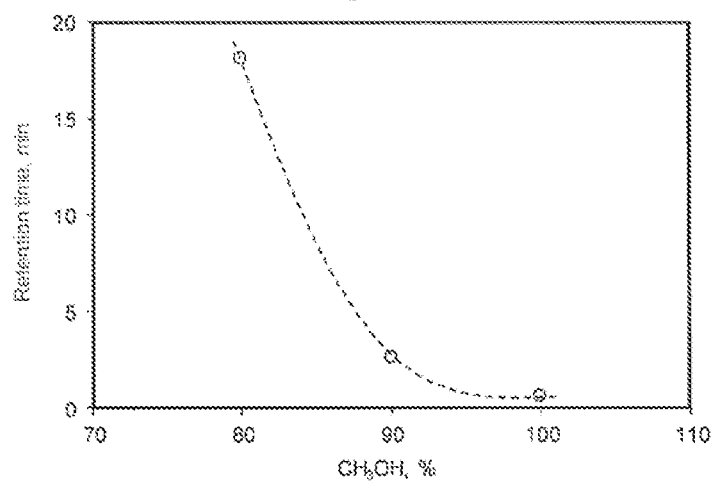
FIG. 4 shows the effect of different contents of methanol in a C18 column on the retention behavior.

Further, the retention behavior of the C18 column was examined with different contents of methanol. Although decrease in the content of methanol in the mobile phase results in increase in the retention time of vitamin $D_3$ (FIG. 4), the C18 column can still employ a high content of methanol solution as the modifier. That is, it is possible to use the same composition for the modifier in the SFC and the mobile phase used for the C18 column. That is, a high content of methanol not only allows vitamin $D_3$ to be rapidly eluted from the diol group column, but also ensures sufficient retention time of vitamin $D_3$ in the C18 column.

Thus, the above analysis reveals that both of the modifier in the SFC column and the mobile phase used for the C18 column can be a high content of methanol.

The modifier in the SFC column and the modifier of the mobile phase in the C18 column were determined. Then, the switching time from the SFC column to the pretreatment C18 column was set to 8.5 minutes, and the switching time from the pretreatment C18 column to the reverse phase separation C18 column was set to 17.5 minutes.

<Analysis of Vitamin $D_2$ and $D_3$ Standard Samples>

Figure 5:
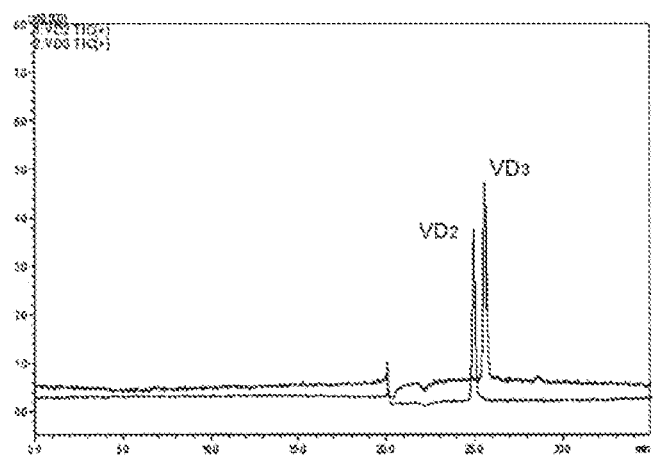
FIG. 5 shows the result of a detection analysis on a standard sample.

A series of standard solutions containing vitamin $D_2$ and $D_3$ were injected in the column switching system. As shown in FIG. 5, vitamin $D_2$ and $D_3$ were eluted from all the three columns, and were respectively detected at the time point of 24.9 minutes and 25.5 minutes by the MS/MS. The two peaks of vitamin $D_2$ and $D_3$ were sharp and symmetry, resulting in complete separation. The solvent peak was detected at the time point of 20.0 minutes.

Figure 6:
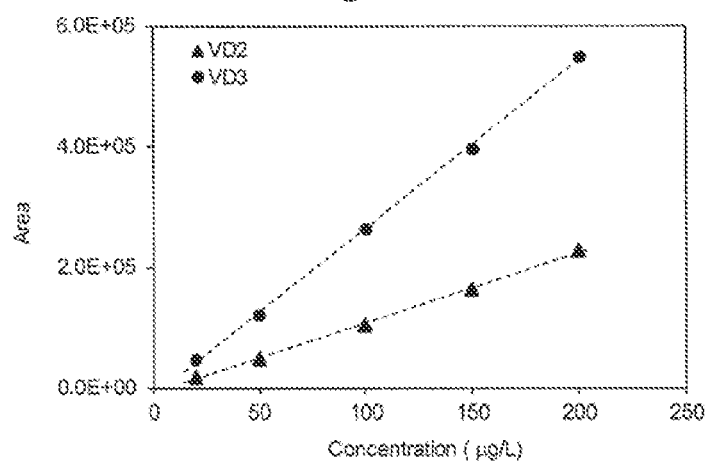
FIG. 6 shows the result of a detection analysis on a standard sample.

Further, calibration curves were created for five concentrations (20, 50, 100, 150, and 200 µg/L)(FIG. 6). Curves with a favorable linearity were obtained in the detection range of 20 to 200 µg/L, and the linear correlation coefficient was 0.998 or more (Table 1). The detection limits of the vitamin $D_2$ and $D_3$ standard samples were respectively 20 µg/L and 16 µg/L.

TABLE 1

Level of linearity of vitamin D detection in column switching system

| Component | Formula | $r^2$ | Linear range (µg/L) |
|---|---|---|---|
| Vitamin $D_2$ | y = 1159.1x − 8199.7 | 0.9987 | 20~200 |
| Vitamin $D_3$ | y = 2792.5x − 15359 | 0.9991 | 20~200 |

<Analysis of Oily Droplet of Vitamin $D_3$>

Figure 7:
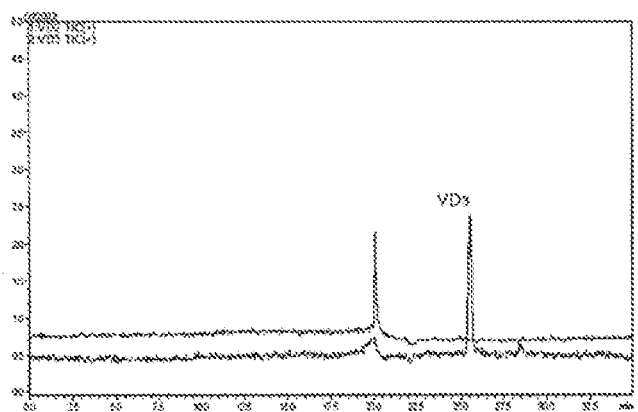
FIG. 7 shows the analysis of oily droplet vitamin $D_3$.

As shown in FIG. 7, a vitamin D supplement for infants, Baby Ddrops was directly analyzed by using the analysis system of the present invention. An oily sample was diluted with n-hexane, and then the diluted sample was injected into the analysis system. A favorable reproducibility was obtained (n=6, RSD=1.47%, n is the number of measurements, and RSD is the standard deviation), and a recovery of approximately 100% was obtained.

INDUSTRIAL APPLICABILITY

The detection method and the apparatus of the present invention can be used for analysis of highly lipophilic components, in particular, vitamin D components in the industrial production.

REFERENCE SIGNS LIST

11 . . . $CO_2$ Pump
12 . . . Methanol Liquid Pump
13 . . . Autosampler
14 . . . Supercritical Chromatography Column (Diol Group)
15 . . . Detector (Diode Array Detector)
16 . . . Pressure Control Unit (Back-Pressure Control Unit)
21 . . . Methanol Liquid Pump
22 . . . Reverse Phase Liquid Chromatography Column (C18)
23 . . . Reverse Phase Liquid Chromatography Column (C18)
24 . . . Mass spectrometric Detector
41-46 . . . Six-Way Valve Group

The invention claimed is:

1. An analysis system comprising:
an autosampler;
a multidimensional chromatography system including a supercritical chromatography column and two reverse phase liquid chromatography columns, a nonpolar substance being eluted and removed in the supercritical chromatography column, and a weakly polar substance being adsorbed to a stationary phase of the supercritical chromatography column and further transported to the two reverse phase liquid chromatography columns;
a column oven in which a column is to be provided;
a liquid pump configured to transport a modifier to the supercritical chromatography column and transport a mobile phase to the two reverse phase liquid chromatography columns; and
a mass spectrometer, wherein:
the two reverse phase liquid chromatography columns include a first reverse phase liquid chromatography column and a second reverse phase liquid chromatography column;
the weakly polar substance adsorbed to the supercritical chromatography column is transported to the first reverse phase liquid chromatography column by only an action of the modifier to remove the supercritical mobile phase flowing out of the supercritical chromatography column in the first reverse phase liquid chromatography column; and
the weakly polar substance is transported to the second reverse phase liquid chromatography column to separate a component.

2. The system according to claim 1, wherein the modifier is selected from alcohol, nitrile, and an aqueous solution of alcohol or nitrile.

3. The system according to claim 1, wherein a multi-way valve group connects or switches connection between the supercritical chromatography column and the two reverse phase liquid chromatography columns in the multidimensional chromatography system.

4. The system according to claim 1, wherein, in the supercritical chromatography column:
a stationary phase is selected from a silica gel modified with a polar group selected from a hydroxy group, an amino group, and a cyano group; and
a mobile phase is supercritical carbon dioxide.

5. The system according to claim 1, wherein, in the reverse phase liquid chromatography column:
a stationary phase is selected from a silica gel modified with a hydrophobic group selected from a hydrocarbon group; and the mobile phase is a polar organic solvent or an aqueous solution of a polar organic solvent.

6. The system according to claim 1, wherein at least the reverse phase liquid chromatography column configured to perform separation of the weakly polar substance is placed in a column oven.

7. The system according to claim 1, wherein the system has a pretreatment column configured to separate a protein component in a sample to be analyzed.

8. The system according to claim 1, wherein the system is used for automatically detecting a highly lipophilic component in an oil or fat, or a biological sample.

9. The system according to claim 8, wherein the highly lipophilic component is vitamin D.

10. A method for rapidly detecting vitamin D in an oil or fat or a biological sample, comprising:
step S1 of preparing a sample to be analyzed;
step S2 of separating vitamin D in the sample to be analyzed by using a multidimensional chromatography system; and
step S3 of detecting the vitamin D separated in the step S2, wherein:
in the step S2, the multidimensional chromatography system includes a supercritical chromatography part and a reverse phase liquid chromatography part which are sequentially connected;
the reverse phase liquid chromatography part includes two reverse phase liquid chromatography columns;
the two reverse phase liquid chromatography columns include a first reverse phase liquid chromatography column and a second reverse phase liquid chromatography column;
the supercritical chromatography part includes a supercritical mobile phase and a modifier;
the modifier is selected from alcohol, nitrile, and an aqueous solution of alcohol, or nitrile; and
in the step S2, a weakly polar substance adsorbed to a supercritical chromatography column is transported to the first reverse phase liquid chromatography column by only an action of the modifier to remove a supercritical mobile phase flowing out of the supercritical chromatography part in the first reverse phase liquid chromatography column, and the weakly polar substance is transported to the second reverse phase liquid chromatography column to separate a component.

11. The method according to claim 10, wherein the supercritical chromatography part includes one supercritical chromatography column.

12. The method according to claim 10, wherein a multi-way valve group connects the two reverse phase liquid chromatography columns in the multidimensional chromatography system.

13. The method according to claim 10, wherein, in the supercritical chromatography part:
a stationary phase is selected from a silica gel modified with a polar group selected from a hydroxy group, an amino group, and a cyano group; and
the supercritical mobile phase is supercritical carbon dioxide.

14. The method according to claim 10, wherein, in the reverse phase liquid chromatography part:
a stationary phase is selected from a silica gel modified with a hydrophobic group selected from an alkyl group; and
a mobile phase is a polar organic solvent or an aqueous solution of the polar organic solvent.

15. The method according to claim 10, wherein the two reverse phase liquid chromatography columns of the reverse phase liquid chromatography part are identical or different.

16. The method according to claim 10, wherein, the step S2 further comprises:
step S21' of separating a component of the sample to be analyzed by using supercritical chromatography and transporting the weakly polar substance to the first reverse phase liquid chromatography column of the reverse phase liquid chromatography part;
step S22' of removing the supercritical mobile phase flowing out of the supercritical chromatography part in the first reverse phase liquid chromatography column; and
step S23' of introducing into the first reverse phase liquid chromatography column, a mobile phase for transporting the weakly polar substance present in the first reverse phase liquid chromatography column to the second reverse phase liquid chromatography column to obtain a vitamin D as the component,
wherein transport of the weakly polar substance to the first reverse phase liquid chromatography column in the step S21' is performed at the same time as the step S22'.

17. The method according to claim 10, further includes, before the step S2, a step of separating a protein component in the sample to be analyzed by using a pretreatment chromatography column,
wherein, in the step S3, detection is performed by using a mass spectrometer.

* * * * *